United States Patent

Lundin

(10) Patent No.: US 8,721,897 B2
(45) Date of Patent: May 13, 2014

(54) OIL COLLECTING APPARATUS AND METHOD

(75) Inventor: Lars Ingram Lundin, Hanko (FI)

(73) Assignee: M&L Patent Oy Ab, Hanko (FI)

( * ) Notice: Subject to any disclaimer, the term of this patent is extended or adjusted under 35 U.S.C. 154(b) by 291 days.

(21) Appl. No.: 13/128,077

(22) PCT Filed: Nov. 4, 2009

(86) PCT No.: PCT/FI2009/050885
§ 371 (c)(1),
(2), (4) Date: Jul. 7, 2011

(87) PCT Pub. No.: WO2010/052369
PCT Pub. Date: May 14, 2010

(65) Prior Publication Data
US 2011/0253642 A1 Oct. 20, 2011

(30) Foreign Application Priority Data

Nov. 6, 2008 (FI) ................................ 20080607

(51) Int. Cl.
| | |
|---|---|
| *E02B 15/06* | (2006.01) |
| *E02B 15/10* | (2006.01) |
| *E02B 15/04* | (2006.01) |
| *C02F 103/00* | (2006.01) |

(52) U.S. Cl.
CPC ............ *E02B 15/047* (2013.01); *E02B 15/048* (2013.01); *E02B 15/06* (2013.01); *E02B 15/106* (2013.01); *C02F 2103/007* (2013.01); *Y10S 210/923* (2013.01)
USPC .................. 210/747.6; 210/776; 210/170.05; 210/170.11; 210/242.3; 210/923; 405/66

(58) Field of Classification Search
USPC ......... 210/747.5, 747.6, 776, 170.05, 170.09, 210/170.1, 170.11, 242.3, 923; 405/66
See application file for complete search history.

(56) References Cited

U.S. PATENT DOCUMENTS 3,321,923 A * 5/1967 Smith et al. ..................... 405/66
3,768,656 A 10/1973 Nugent
(Continued)

FOREIGN PATENT DOCUMENTS

| DE | 203 07 333 U1 | 9/2003 |
|---|---|---|
| FI | 20060128 A | 8/2007 |
| GB | 2 042 355 A | 9/1980 |
| GB | 2 414 967 A | 12/2005 |

OTHER PUBLICATIONS

International Search Report, dated Jan. 26, 2010, from corresponding PCT application.

(Continued)

*Primary Examiner* — Christopher Upton
(74) *Attorney, Agent, or Firm* — Seppo Laine Oy; Joshua P. Wert

(57) ABSTRACT

An oil collecting apparatus and a corresponding method for collecting oil from the surface of water, the oil collecting apparatus includes a set of oil booms (3) coupled to form a long line of oil booms. The line of oil booms includes, at a distance from each other, a number of anchorage points (4) for anchoring the oil boom (3) onto the sea bed and, in addition, between the anchorage points and in conjunction with the oil boom there is an oil collecting station (5) for collecting the oil directed by the booms from the surface of water.

18 Claims, 5 Drawing Sheets

(56) References Cited

U.S. PATENT DOCUMENTS

Figure 1A:
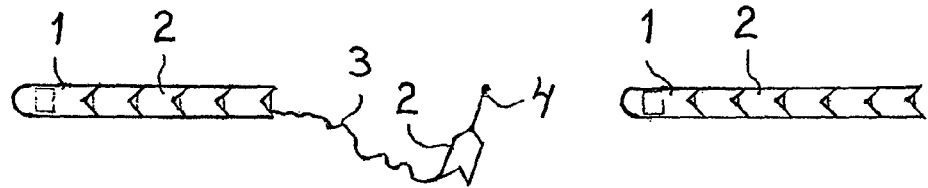

| | | | |
|---|---|---|---|
| 3,850,807 A * | 11/1974 | Jones | 210/242.3 |
| 4,057,498 A | 11/1977 | Vidilles | |
| 4,089,178 A * | 5/1978 | Kinase et al. | 405/66 |
| 4,133,765 A | 1/1979 | Stupica | |
| 4,356,086 A | 10/1982 | Oberg | |
| 4,449,850 A * | 5/1984 | Cessou et al. | 210/923 |
| 4,480,800 A * | 11/1984 | Oberg et al. | 210/923 |
| 4,554,072 A | 11/1985 | Ayers | |
| 5,338,132 A * | 8/1994 | Lahar et al. | 210/923 |
| 6,221,256 B1 * | 4/2001 | Kimura | 210/747.6 |
| 2003/0010685 A1 | 1/2003 | Michel, Jr. | |

OTHER PUBLICATIONS

Finnish Search Report, dated Aug. 18, 2009, from corresponding PCT application.

* cited by examiner

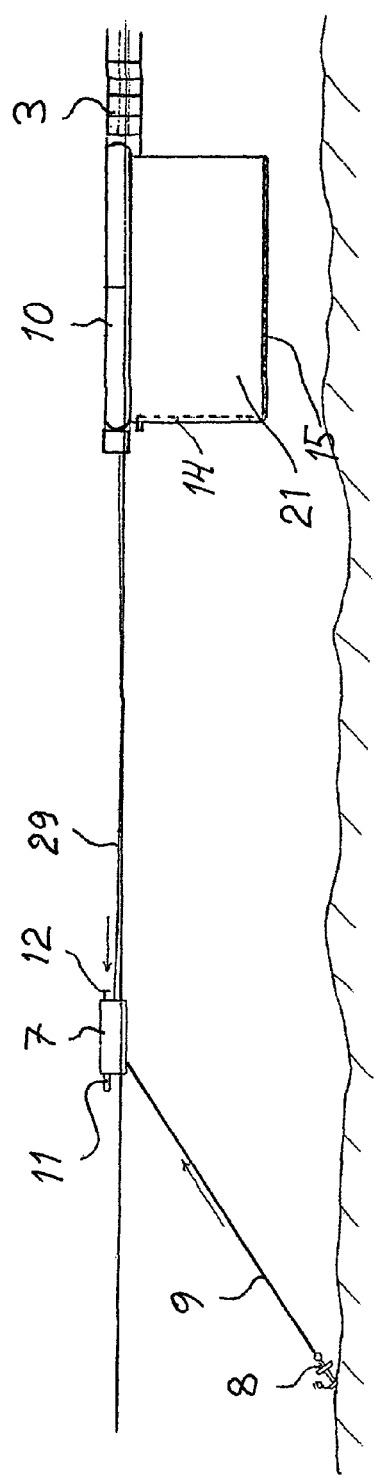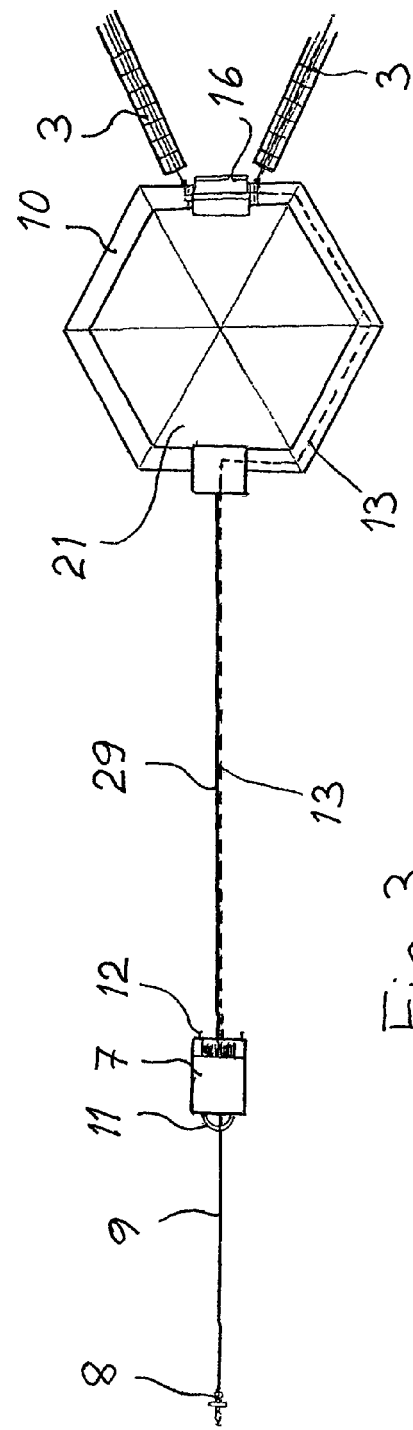

OIL COLLECTING APPARATUS AND METHOD

FIELD OF THE INVENTION

The invention relates to an oil collecting apparatus as defined in the preamble of claim 1 and to a method for collecting oil from the surface of water as defined in the preamble of claim 11.

BACKGROUND OF THE INVENTION

The number of oil transports is continuously increasing on the world's seas and consequently the risk of oil spills has become higher than ever. Once an oil spill has occurred, the most important factor in the response is promptness. The faster the spill area can be isolated and the oil collected out of the water, the fewer are the problems that will be caused to the nature and people and the lower the costs of the entire rescue operation.

Currently, various oil booms which can be drawn relatively quickly from a ship out into the water are known per se. Similarly, various skimmers and equivalent oil collectors based on the brush technology as well as various aspirators are known for removing oil from the surface of water in one way or another.

However, the existing apparatuses are designed to operate on the two-step premise that first, spreading of the oil is prevented and effectively limited to a specific area by booms. Then, the oil is removed from the delimited area. The activation of the oil-removing devices normally takes up a long time as various collecting vessels are made operational or as the skimmers or equivalent collectors are made operational. The slow start of the collection operation often leads to a situation where some of the oil escapes, the weather conditions become disadvantageous, and the collection has to be postponed, only hoping that until then, the oil will stay within the area limited by the booms.

OBJECTIVE OF THE INVENTION

The objective of the invention is to eliminate the drawbacks of the prior art referred to above. In particular, the objective of the invention is to disclose a new oil collecting apparatus and a corresponding oil collecting method which allow full oil spill response immediately after the booms have been deployed around the spill site or ahead of the advancing oil slick. Further, the objective of the invention is to disclose a new oil collecting method for recovering the oil spills already from the surface of water before they reach the shore, which makes the collection faster, easier and less expensive.

SUMMARY OF THE INVENTION

The oil collecting apparatus for collecting oil from the surface of water according to the invention comprises a set of oil booms coupled to form a long line of oil booms. According to the invention, the line of oil booms comprises, at a distance from each other, several anchorage points for anchoring the oil boom onto the sea bed. Further, between the anchorage points and in connection with the oil boom there are oil collecting stations so that the oil collected and directed by the booms can be recovered from the surface of water. In this way, the apparatus according to the invention constitutes a complete assembly which operates in a two-stage manner just by being deployed onto the surface of water, i.e. limiting and preventing the free movement of oil on the surface of water as well as immediately separating and collecting the oil from the surface of water. The set of oil booms can be deployed so as to be operational even at the normal cruising speed of the employed ship or boat. Further, it should be noted that in the invention the term "operational" does not only refer to the deployment of the oil boom onto the water but also to the onset of oil collection at full effectiveness.

Preferably, each oil collecting station comprises an oil collector and a floating receiver connected thereto. Various oil collectors can be used per se, case-specifically, as the oil collector, but preferably, the oil collector is a skimmer. A skimmer which is based on a horizontally rotating brush structure is small, effective, light-weighted and operates well by itself without control or monitoring.

Preferably, the apparatus according to the invention comprises a number of transport units in which the oil booms and the respective oil collecting stations and anchorages are packed tightly. As the oil booms and the associated equipment in each transport unit are already coupled together, and further, as the transport units are coupled sequentially to each other, it is possible to draw from them and provide an immediately operational oil boom corresponding to the combined length of all of the oil booms without any coupling operations at the oil spill response site.

Preferably, the transport unit is formed by a floating transport raft. In this case, the transport rafts can be coupled sequentially to form a sufficiently long line which can be towed to the oil spill response site by a single vessel, i.e. a motor boat. Then, as the transport rafts are already coupled together, it suffices at the oil spill response site to just stretch them quickly to form a straight united structure on the way of the approaching oil slick.

The oil spill response according to the invention can also be carried out using storage cassettes equivalent to the floating transport rafts. The storage cassettes are accommodated on the ship's deck to open toward the stern. All the oil booms they contain are coupled together through suitably alternating oil collecting stations and anchorage points. In this manner, correspondingly, by steering the ship just along the desired control line and by letting the boom structures slide from the storage cassettes onto the water, the oil spill response and collection can be started.

The invention also relates to a method for collecting oil from the surface of water, in which method a floating oil boom is set in the water in a substantially perpendicular direction to the course of movement of the oil. According to the invention, the oil boom is anchored onto the sea bed by several anchorage points at a distance from each other, this distance being clearly smaller than the length of the oil boom between them. In addition, the oil boom between two anchorage points is arranged in a V-shape oriented away from the approaching oil slick, and an oil collecting station is secured to the oil boom at the tip of the V-shape, whereupon the oil gathered at the V tip is lifted from the water into the oil collecting station.

Preferably, the oil collecting station is anchored and tightened in its position by anchorage in the opposite direction to the anchorage direction of the anchorage points. On the other hand, it is also possible to let the oil collecting station float freely along the oil boom, forming a V-shaped oil boom structure by the effect of wind and water currents. In particularly urgent cases, the oil boom can in this way be made operational very quickly. The oil collecting equipment can then be anchored after the situation has settled and the oil booms are operational in their position.

Preferably, the anchorage means comprises a floating body component comprising an anchor, an anchor rope and a power unit for rolling up the anchor rope and drawing the anchor. An accumulator-operated electric motor can be used as the power unit because, suitably, the anchor needs to be used only once at the target site. For example, the anchor is drawn by boat from the anchorage means set in the water for the entire length of the anchor rope and cast into the sea. Then, the device drags the anchor by itself over the sea bed until a sufficiently strong grip of the anchor at the sea bed is obtained.

Accumulators and the electric motor may be used as the power unit in the oil collecting device to rotate the skimmer and to pull the anchor rope tight. However, longer operation with accumulators requires the accumulators so heavy that a more preferred solution would be to use power supply cables or a light-weighted and small combustion engine.

The oil booms used in the invention may vary case-specifically in structure and materials. The essential feature is their sufficient tensile strength so that the entire structure can be quickly unpacked and drawn into the water to be operational.

The transport rafts and oil collecting stations used in the invention may constitute part of the oil boom, i.e. the ends of two adjacent oil booms are coupled to different sides thereof. It is also possible that the oil collecting device or the transport raft is a device which is separate of the oil boom and coupled only in conjunction therewith, so that the oil boom is continuous and united for the entire length of the system.

The oil collecting apparatus and oil collecting method according to the invention provide considerable advantages as compared with the prior art. The greatest and the most important advantage of the invention is promptness and efficiency of oil collection. According to the invention, the oil boom can be made operational just by quickly releasing one after the other from the tail of the boat or by dropping one after the other into the water from the ship's deck, and the term "operational" in the invention does not only refer to the prevention of spreading of the oil, but also to efficient collection and removal of the oil from the surface of water.

LIST OF FIGURES

Figure 1B:
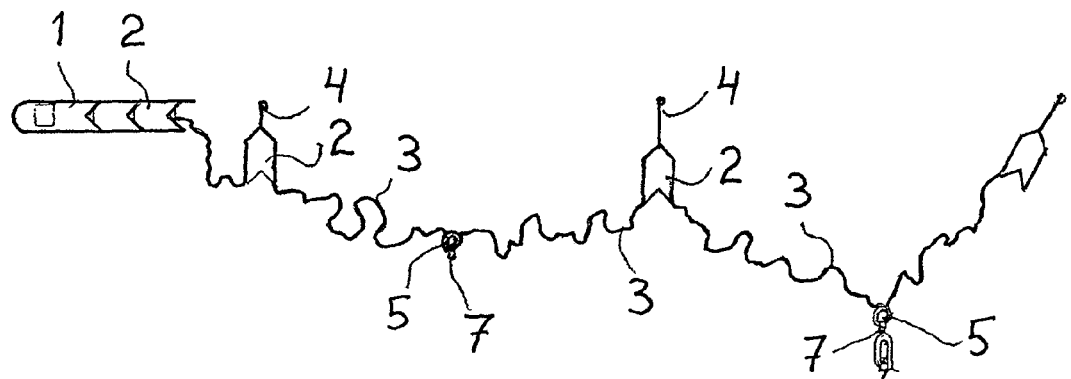
Figure 1C:
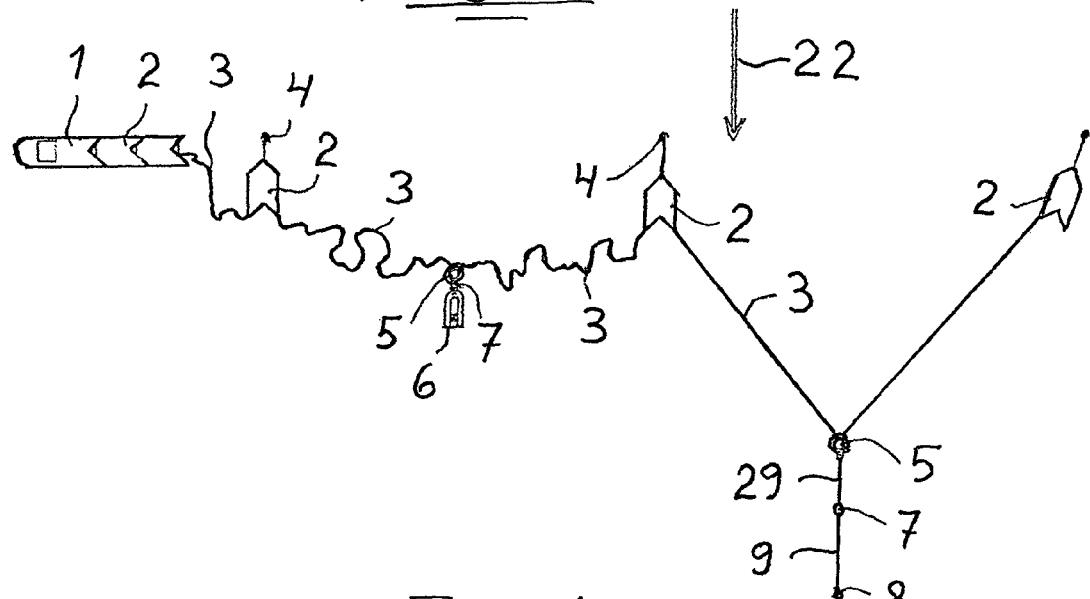
Figure 4:
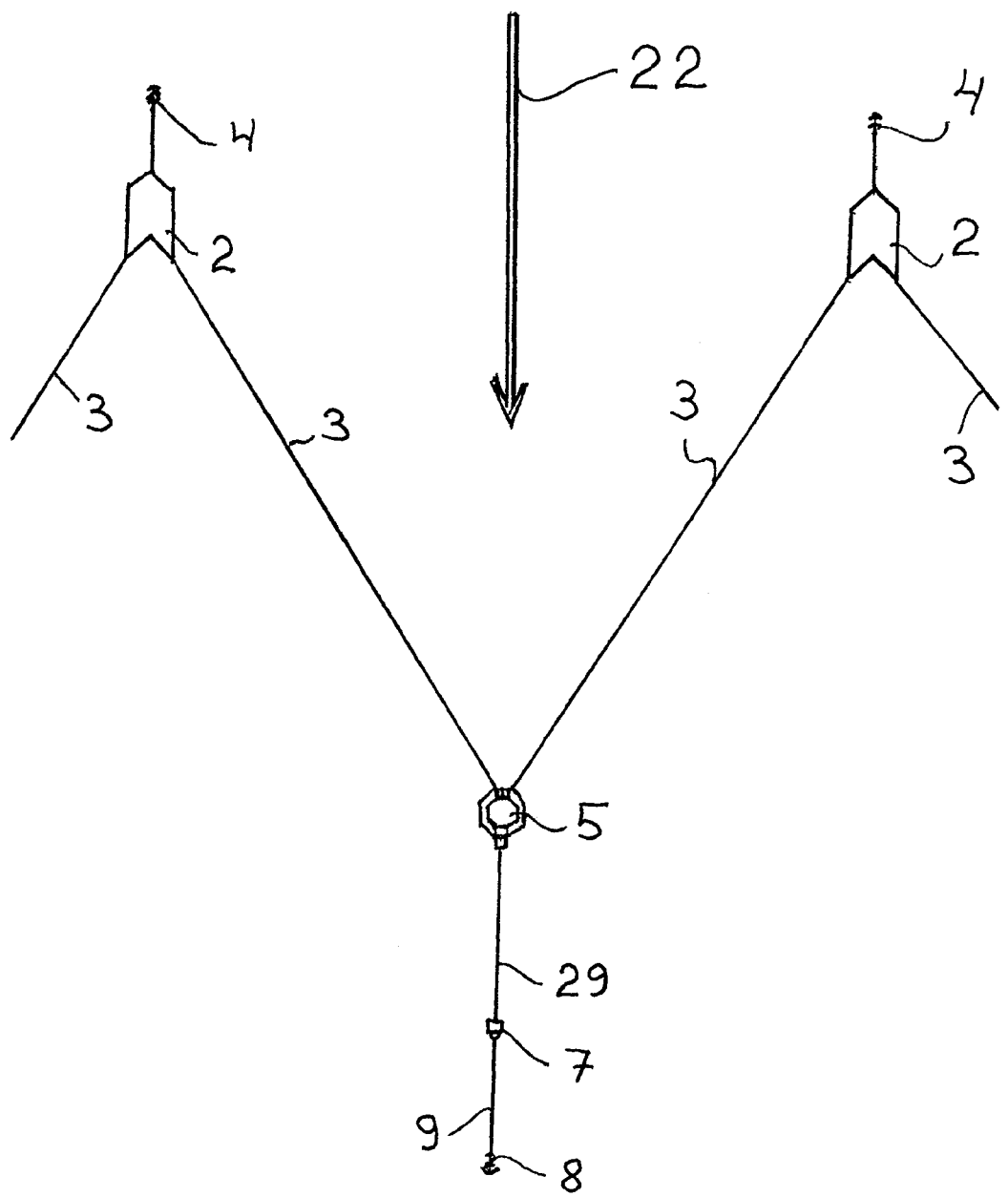
Figure 5:
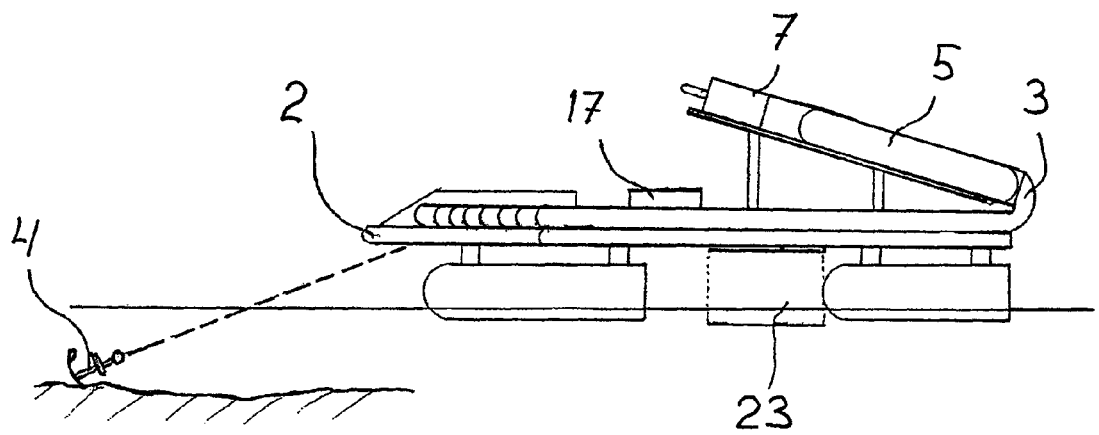
Figure 6:
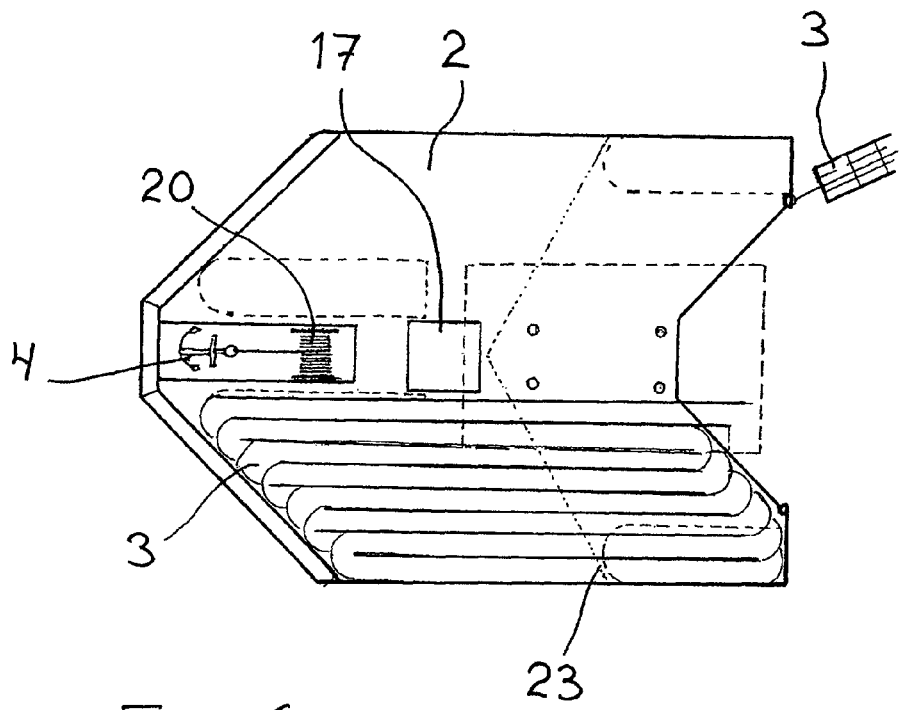
Figure 7:
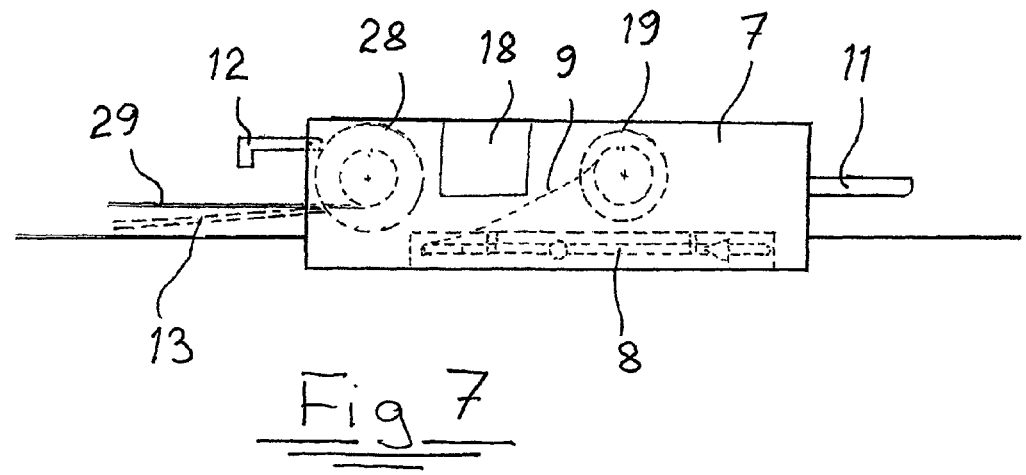
Figure 8:
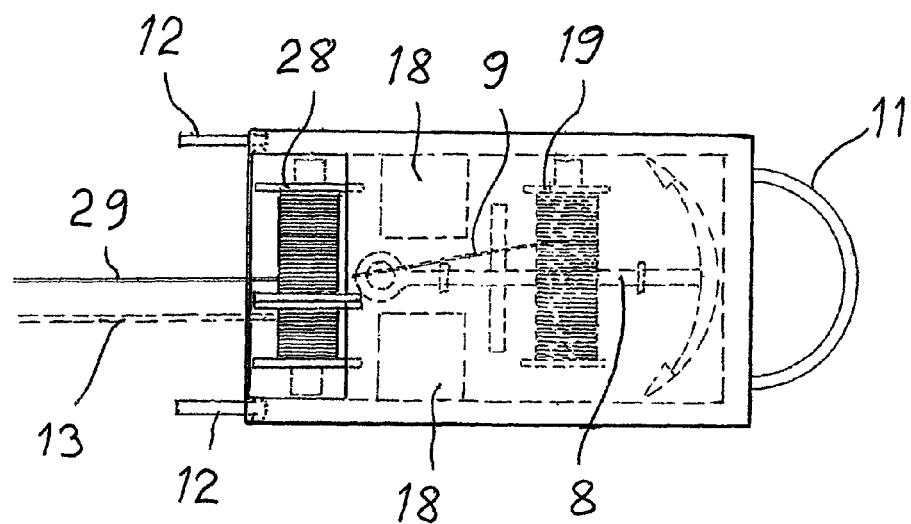

In the following section, the invention will be described in detail with reference to the accompanying drawings, in which FIG. 1a-1c illustrate the activation of the apparatus according to the invention step by step, FIG. 2 illustrates the oil collecting part of the apparatus of FIG. 1 as seen from the side, FIG. 3 illustrates the apparatus of FIG. 2 as seen from the top, FIG. 4 illustrates a detail of the apparatus of FIG. 1c, FIG. 5 illustrates the transport raft as seen from the side, FIG. 6 illustrates the transport raft of FIG. 5 as seen from the top, FIG. 7 illustrates the anchorage unit as seen from the side, and FIG. 8 illustrates the anchorage unit of FIG. 7 as seen from the top.

DETAILED DESCRIPTION OF THE INVENTION

The oil spill response apparatus according to the invention is illustrated on the right in FIG. 1a in the standby or the storage state, comprising a vessel 1, i.e. a motor boat of a suitable size and power, with a number of transport units 2 or transport rafts coupled thereafter. In an oil spill response situation the assembly is steered to the response site and, according to the left-side example, the first transport raft is decoupled and anchored 4 so as to release a first oil boom 3 therefrom.

According to FIG. 1b and 1c, the vessel 1 tows the remaining transport rafts 2, anchoring them one by one at such distance from each other that the length of the oil boom 3 released between them is clearly greater than said distance. Halfway of the oil boom 3 between two anchorage points 4 there is an oil collecting station 5. The oil boom is towed by a work boat 6 from the oil collecting station 5 in the direction of the wind 22, i.e. in the direction of movement of the oil slick. Connected to the oil collecting station 5 by a wire 29 is an anchorage unit 7, comprising at the end of the wire an anchor 8 for anchoring the oil collecting station in its position onto the sea bed. In this manner, the oil booms 3 can be arranged in a V-shape to receive and collect the oil slick that is floating toward them.

FIGS. 2 and 3 illustrate in more detail the oil collecting station 5 and the anchorage as seen from the side and from the top. The oil collecting station 5 comprises a floating ring 10 with a flexible bag-shaped receiver 21 suspending therefrom. To let the receiver open by itself to the operational state, it is provided at the bottom with a chain 15 as a weight and at the side with a water intake pipe 14 for first filling the receiver with water. The booms 3 are secured to one side of the ring 10 with a skimmer 16 therebetween to lift the oil gathered between the booms 3 into the receiver 21. From the opposite side, a wire 29 extends to the anchorage unit 7 wherefrom another wire 9 extends to the anchor 8. In addition, a power supply connection 13 is conducted from the transport raft through the boom 3 to the skimmer 16 and to the anchorage unit 7.

FIG. 4 illustrates more specifically a detail of FIG. 1c. It shows specifically how a V-shaped mouth is formed of the oil booms 3 between two anchorage points 4 and anchored transport rafts 2, toward which mouth the wind 22 and water currents build up the oil on the surface of water. Then, a skimmer at the mouth lifts the oil into the oil collecting station 5.

FIGS. 5 and 6 illustrate one floating transport raft 2 towed by a boat in a line according to the invention. The transport raft comprises a power unit 17 for producing and supplying electricity to the windlass of the anchor 4 and, through a cable extending along the oil boom 3, to the skimmer 16 and the anchorage unit 7. Further, the transport raft comprises on both of its sides the oil booms 3 tightly folded in a pile, although FIG. 6 only shows the booms on one side. The oil collecting station 5 and the anchorage unit 7 coupled thereto are supported on top of these booms on an inclined stand. The transport rafts 2 as well as the oil booms 3 and the oil collecting stations 5 they contain are coupled together to form a continuous and unbroken structure so that by decoupling the rafts from each other one by one and by letting the oil booms be released therefrom into a long line a united structure is provided, preventing the penetration of oil floating on the surface of water. In addition, the transport raft is provided with a protective wall 23 which connects the diverging oil booms 3 so that oil cannot escape to the other side of the protecting structure at the transport raft.

FIGS. 7 and 8 illustrate more specifically one anchorage unit 7 used in the invention. It is connected by a wire 29 and a windlass 28 thereof and by an electric cable 13 to the respective oil collecting station 5. It is formed by a floating casing comprising locking hooks 12 whereby it is first secured to the oil collecting station 5. It comprises at the other end a drawing grip 11 which is drawn by the above-mentioned work boat 6 to separate it from the oil collecting station 5. Further, the anchorage unit 7 comprises an anchor 8 with a windlass 19 for anchoring it onto the sea bed. Further, this embodiment illustrates as an alternative or complementing structure accumulators 18 of the electric cable 13 for using the windlasses and keeping the wires tight also during use.

Accordingly, the invention relates to an oil collecting apparatus wherein separately anchored transport rafts 2 decoupled from the line of the vessel as well as their fixtures and the associated oil booms 3 and oil collecting stations 5 direct and collect the oil or other equivalent impurity released on the surface of water. The transport raft 2 is for example a transportation means which can be anchored by pontoons and which is provided with a deck and comprises at least the oil booms connected to the raft, the oil collecting station to be set into the water, and the power unit for conducting electricity to the anchor of the transport raft, to the oil collector and to the anchorage unit 7. The oil collecting station 5 is provided with a receiver 21 floating in the flotation ring 10 and with the anchorage unit comprising an anchor, wires and windlasses. A tightening wire of the anchorage unit is secured to the flotation ring 10. The oil collecting station comprises further a collector 16 secured to the flotation ring and water intake and a chain as weight for drowning the receiver.

The anchorage unit which is secured to the oil collecting station by hooks or the like is provided with a grip which, when drawn by the work boat, releases the anchorage unit and its functions from the oil collecting station. The anchorage system is formed so that the transport rafts connected to the vessel in a line formation are transported to the spill site. Having arrived at the right position, the transport raft is released from towing and anchored so that the bow side of the transport raft is set against the wind. After anchoring of the first transport raft, the formation of an elongated apparatus on the sea surface is started. In principle, the first transport raft need not be equipped with other devices than the anchor and the power unit. After anchoring of the first transport raft, the transport rafts in the line of the vessel continue further so that, from the next raft, the oil boom and the tank to receive the oil along with their fixtures are dropped to the sea surface. After the oil booms and the oil collecting station which have been set on the surface of the sea the transport raft is decoupled from the line and anchored whereupon the longitudinal direction of the system is starting to be formed. As the oil booms and the oil collecting station float on the surface of water, the lateral direction of the system is formed and, at the same time, the anchorage unit 7 secured to the collecting station by hooks 12 and provided with the grip 11, as well as its functions, can be released by the work boat 6. When the grip is drawn, the anchorage unit is released and the wire and the electric cable are uncoiled as needed until the anchorage unit is anchored. The wires are tightened by windlasses of the anchored anchorage unit to such extent that the oil booms 3 secured to the anchored transport rafts 2 become tightened as well and the system is provided its correct form on the surface of water in the lateral direction so that the oil can be directed into the collecting station 5.

The operation of the receiver 21 in the anchored system preferably requires that the receiver is filled with water to stabilize its operation. The water intake is arranged for example by fastening inside the receiver at least one hose which is provided with suction effect by using a chain that functions as a counterweight as the bottom of the receiver sinks deeper into the water. The hose wherein the inlet opening is set below the water surface and extends to the bottom of the receiver should be flexible and form-preserving. As the chain sinks towards the sea bed, water is sucked into the receiver. The transmission of power to the collector and to the anchorage unit is provided preferably electrically. The transmission of electricity should be carried out so that an electric cable 13 extends along with the oil boom from the power unit of the transport raft, supplying power to the skimmer and further to the anchorage unit. The function of the underlying protecting wall is to prevent oil from escaping from below the transport raft in the area between the oil booms. The system is preferably such that decoupling of the transport rafts from the line and their anchorage is carried out using accumulators and that the transport raft and the anchor can be launched remotely from the vessel. The anchorage unit is also preferably built so as to be provided with accumulators, and the wires are loosened and tightened remotely.

The invention is not limited merely to the examples referred to above; instead, many variations are possible within the scope of the inventive idea defined by the claims.

The invention claimed is:

1. An oil collecting apparatus for collecting oil from the surface of water, the oil collecting apparatus comprising:
   a number of transport units, each transport unit having packed thereon; an anchorage and a set of oil booms coupled to form a long line of oil booms, said set of oil booms is connected to an oil collecting station for collecting the oil directed by the booms, wherein said set of oil booms and said oil collecting station are packed and coupled together in a directly deployable united assembly, and
   wherein the number of transport units are coupled to each other by the set of oil booms packed on one transport unit being connected to another transport unit via the oil collecting station.

2. The oil collecting apparatus according to claim 1, wherein the oil collecting station comprises an oil collector and a floating receiver connected thereto.

3. The oil collecting apparatus according to claim 1, wherein each transport unit is formed by a floating transport raft, and wherein the transport rafts are coupled in a line to be towed by a single vessel.

4. The oil collecting apparatus according to claim 3, wherein the transport raft comprises a power unit having a power supply connection to the oil collector and to the anchorage.

5. The oil collecting apparatus according to claim 3, wherein the anchorage of each transport unit comprises a windlass including wires and an anchor for anchoring the transport unit in its position.

6. The oil collecting apparatus according to claim 3, wherein the oil collecting station further comprises an anchorage unit with an anchor, an anchor wire and a windlass.

7. The oil collecting apparatus according to claim 3, wherein the transport raft comprises a power unit having a power supply connection to the oil collector and to the anchorage unit.

8. The oil collecting apparatus according to claim 1, wherein each transport unit is formed by a storage cassette, wherein the storage cassettes are located on the deck of the ship to open toward the stern and wherein all the oil booms they contain are coupled together through suitably alternating oil collecting stations and anchorage points.

9. The oil collecting apparatus according to claim 8, wherein the anchorage of each transport unit comprises a windlass including wires and an anchor for anchoring the transport unit in its position.

10. The oil collecting apparatus according to claim 8, wherein the oil collecting station further comprises an anchorage unit with an anchor, an anchor wire and a windlass.

11. The oil collecting apparatus according to claim 1, wherein the anchorage of each transport unit comprises a windlass including wires and an anchor for anchoring the transport unit in its position.

12. The oil collecting apparatus according to claim 1, wherein the oil collecting station further comprises an anchorage with an anchor, an anchor wire and a windlass.

13. The oil collecting apparatus according to claim 12, wherein the anchorage of each transport unit comprises a wire secured to the oil collecting station and a windlass for it.

14. The oil collecting apparatus according to claim 1, wherein the oil collector is a skimmer.

15. A method for collecting oil from the surface of water, comprising the steps of;
   a) steering a vessel with a number of transport units coupled thereto to an anchorage point, each transport unit including an anchorage and a set of oil booms, said set of oil booms connected to a corresponding oil collecting station for collecting oil directed by the oil booms from the surface of the water which are packed and coupled together in a directly deployable united assembly,
   b) decoupling a transport unit from remaining transport units,
   c) anchoring said transport unit via its transport unit's anchorage,
   d) deploying the set of oil booms and the corresponding oil collection station from said decoupled transport unit,
   e) steering the vessel with the remaining transport units coupled thereto to another anchorage point with a distance from the previously anchored transport unit which is smaller than the length of the previously deployed set of oil booms and coupled corresponding oil collecting station,
   f) subsequently decoupling and anchoring a transport unit via its transport unit's anchorage at said distance from the previously anchored transport unit, and forming a V-shaped set of oil booms having the corresponding oil collection station at the tip of the V between the previously anchored transport unit and the subsequently anchored transport unit, and
   repeating the previous steps d) to f) until a plurality of transport units have been decoupled, anchored and their oil booms and corresponding oil collection stations deployed.

16. The method according to claim 15, wherein the oil collecting station is anchored and tightened in its position by an anchorage in a direction which is opposite to the anchorage direction of the anchorage points.

17. The method according to claim 15, wherein the oil collecting station is let to float freely along with the oil booms, forming a V-shaped oil boom construction by the effect of wind and water currents.

18. The method according to claim 15, wherein the oil is collected from the surface of water into a receiver of the oil collecting station by means of an oil collector of the oil collecting station.

* * * * *